Dec. 29, 1964  R. L. McINTYRE  3,162,964
PORTABLE STEAM PUFF IRONS
Filed May 24, 1962
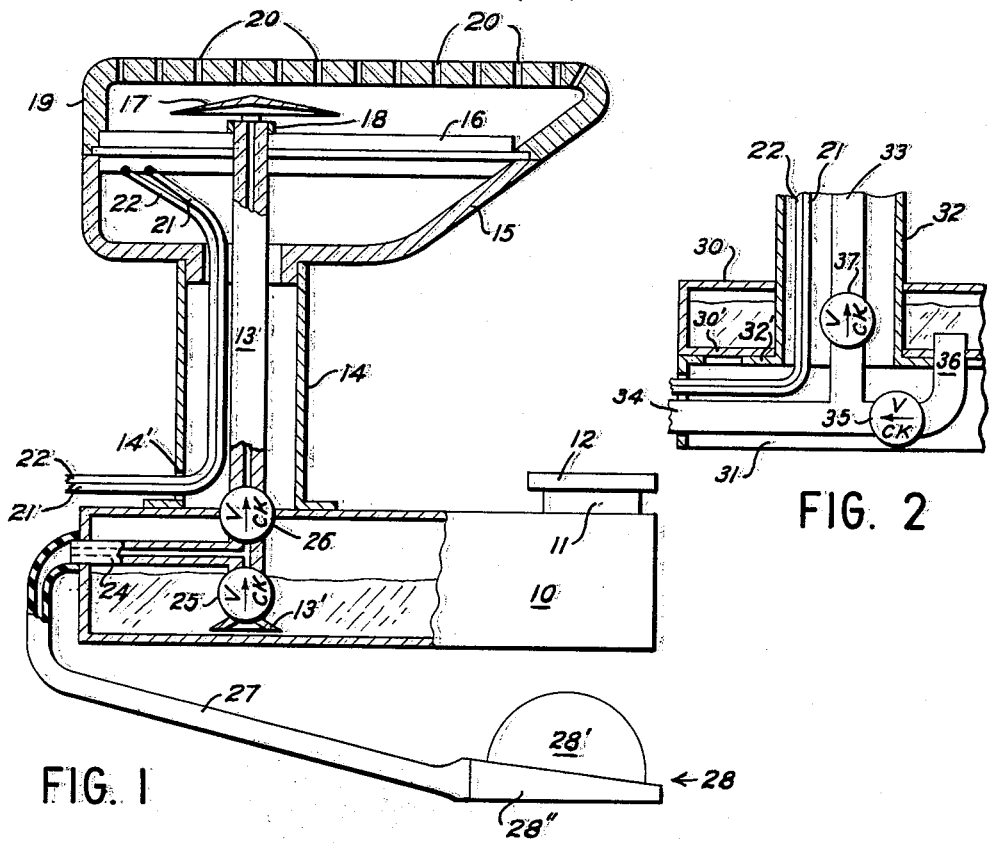
FIG. 2
FIG. 1
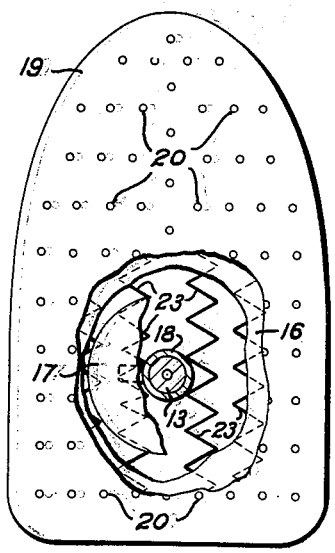
FIG. 3
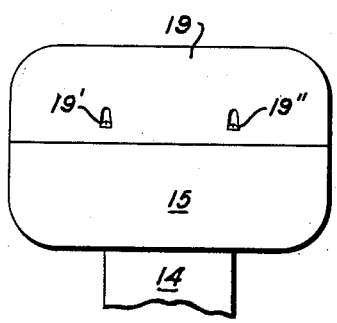
FIG. 4
ROY L. MC INTYRE
INVENTOR.
BY  Loyal H. McCarthy
ATTORNEY.

United States Patent Office 3,162,964
Patented Dec. 29, 1964

3,162,964
PORTABLE STEAM PUFF IRONS
Roy L. McIntyre, Lake Grove, Oreg.
(Rte. 1, Box 640, West Linn, Oreg.)
Filed May 24, 1962, Ser. No. 197,335
10 Claims. (Cl. 38—99)

My invention relates to portable electric steam puff irons which embody a water reservoir and a simple, effective means for applying and controlling water from its reservoir to the heating element to generate steam during the operation of the puff iron.

One object of my invention, therefore, is to provide a simple, effective portable electric steam puff iron which contains its own water reservoir and embodies means for applying and controlling the supply of water to its heating element.

Another object of my invention is to provide a portable electric steam puff iron incorporating simple means for diverting water from its reservoir to the top surface of its electric element, which means is also effective to control the generation of steam in the puff iron.

A further object of my invention is to provide a portable electric steam puff iron which utilizes low pressure steam, which will be simple and convenient to operate and which is capable of effective home or comercial use.

Other and further objects of my invention will be apparent from the drawings, specification and claims herein.

Referring to the drawings:

FIG. 1 is a side elevation of my portable electric steam puff iron, with portions thereof broken away, showing details of the iron head, the water distributing and supply elements, the heating unit, the reservoir and the control means, including the controlling check valves, for applying water to the elements.

FIG. 2 is a fragmentary side elevational view, with portions thereof broken away, showing an alternative arrangement for the standard, check valves, and water supply elements of the puff iron.

FIG. 3 is a top plan view of the head portion of the puff iron, with portions thereof broken away, showing the steam vent holes, the water distributor and water supply line, and the electrical resistance wires of the heating element.

FIG. 4 is a fragmentary end elevation view showing the rear of the puff iron head.

Referring further to the drawings:

The base 10 is a closed tank, preferably water-tight and polyhedronal in shape. A fill pipe 11 is positioned on the top surface of the base 10 near one end thereof and is provided with a cap 12. A water supply pipe 13 is disposed through the top surface of the base tank 10 in spaced relation to the fill pipe 11 and extends vertically from within said tank through the interior of a standard 14 which is disposed on the top surface of the base 10 and supports the lower portion 15 of a puff iron head. The lower end 13' of water supply pipe picks up water, and its upper end discharges it. The water supply pipe 13 passes through an opening in an encased heating element 16, which is preferably thermostatically controlled, and terminates above said heating element in a water distributor 17 which may be a splash shield, distributor pipe or any other suitable means for dispersing the water onto the upper surface of the heating element 16 and which may be either a separate element or integral with said water supply pipe 13. The water supply pipe makes a sufficiently snug fit with the opening through the heating element 16 so that the collar 18, whether a separate element or the base portion of the water distributor, will effect a water-tight seal between the heating element. If necessary, any suitable gasket may be employed in effecting the water-tight seal.

The upper portion 19 of the puff iron head is complementary to the lower portion and may be secured to the lower portion by screws 19' and 19", complementary slots and lips, a combination thereof, or any other suitable arrangement. A plurality of steam vent holes 20 through the upper surface of the puff iron head provides means for supplying steam generated within the head to articles being ironed. Electric supply wires 21 and 22 attach to the encased heating element 16 and supply a flow of electric current from a source of electricity to the resistant wires 23 encased within the heating element 16. The supply wires 21 and 22 pass from the heating element through the interior of the standard 14 and emerge through an opening 14' at the lower end of said standard.

A feed line 24 intersects the water supply pipe 13 near its lower end 13' and within the base tank 10. An intake check valve 25 is positioned, within base 10, in the water supply pipe 13 between its lower end 13' and the point of intersection with the feed line 24. The check valve 25 will allow water to pass from the interior of the base tank 10 but will not allow it to re-enter said tank. Also, an outlet check valve 26 is positioned in the water supply pipe 13 above the point of intersection with the feed line 24 and the water distributor 17 at the upper end of said supply pipe. The check valve 26 will allow water to pass from the feed line 24 and the lower portion of the supply pipe 13 through the upper portions of the supply pipe and out its upper end so as to be dispersed by the water distributor 17 onto the top surface of heating element 16. Check valve 26, however, will not allow water to go back into the tank 10 or the feed line 24. The supply hose 27 forms a water-tight joint with the outer end of the feed line 24 outside base 10. The other end of supply hose 27 effects a water-tight joint with a source of suction-pressure 28, such as a pedally operated pump creating suction and pressure alternately, etc. The element 28 may be of any suitable design or arrangement so long as it will alternately create suction and pressure in drawing water from the puff iron base 10 and feeding it through the water supply pipe 13. The preferred embodiment of the element 28 is a closed, hermispheric ball 28' of pliable and deformable material, such as rubber or plastic, set in a rigid base member 28" to which the supply hose 27 is attached.

A variation of the puff iron standard base tank and water supply pipe, feed line and check valve arrangement is shown in FIG. 2 of the drawings. In this version the tank 30 is also water-tight and provided with fill pipe means. The tank 30 is disposed upon a base skirt 31 which is enclosed on the sides and open on the bottom. The standard 32 passes clear through the tank 30 from top to bottom and is sealed at its flange 32' to the under surface of the tank bottom 30', thereby forming an open passageway through the base skirt 31 to the heating element 16. A water supply pipe 33 is disposed within the standard 32 and is intersected at its lowermost end by a water feed line 34 which extends out through an opening in one side of the base skirt 31. A water pick-up 36 extends into the interior of the tank 30 through the bottom 30' and is attached to a check valve 35 which in turn is attached to the water feed line 34 at a point between the water supply pipe 33 and the water pick-up 36. The check valve 35 will allow water to enter the feed line 34 from the interior of the tank 30 through the pick-up 36 but will not allow water to back up into the tank 30. A second check valve 37 is positioned in the water supply pipe 33 between its juncture with the feed line 34 and the encased heating element 16, preferably at a point near the bottom of the standard 32. The check valve 37 will allow water to pass upwardly through the supply pipe 33 but will not allow it to back up into the lower portion of the water supply pipe 33 or the feed line 34. This alternative arrangement of my improved puff iron enables easy access to all of the working parts thereof, such as the check valves 35 and 37, the water supply pipe 33, the feed line 34 and the pick-up 36, so that in the event of failure the critical parts can be readily replaced or repaired.

In the operation of my device the base tank 10 or 30, as the case may be, is partially filled with water through the fill pipe 11; and the electric service wires 21 and 22 are connected to a source of electric power. The suction-pressure pump 28 is then operated pedally by alternately stepping on the pliable, hemispheric ball portion and releasing same, thereby first causing the air to be exhausted from the suction-pressure pump and then causing water from the base tank to be drawn through the first check valve into the feed line, through the supply hose 27 and into the suction-pressure pump 28. After all air has been exhausted from the suction-pressure pump and after the same has filled with water, continued pedal pumping of the pliable, hemispheric portion thereof will force water through the second check valve 26 or 37, as the case may be, up through the water supply pipe 13 or 33 and against the distributor head 17 which disperses the water onto the upper surface of the heating element 16. As long as the pumping action is continued on the suction-pressure pump, water will be drawn into the same from the tank, then forced up through the second check valve into the water supply pipe 13 or 33, and distributed on the heating element through dispersion by the distributor head 17. Due to the arrangement and action of the two check valves in both disclosed versions of my device, water cannot be forced back into the tank nor can it escape from the water supply pipe at points above the second check valve unless it is forced out of the upper end thereof. It is, therefore, apparent that as along as the pumping action is continued water will be dispersed onto the heating element 16 and steam will be generated. When the pumping action is stopped, the generation of steam will cease almost instantly.

In the event it becomes necessary to remove or replace the upper portion 19 of the puff iron head or to replace the heating element 16, the head is easily disassembled by removing the cap screws 19' and 19'' and disengaging the front portion of the head from the lower portion 15 and from the encased heating element 16. Also, in the version disclosed in FIG. 2 the check valves and various water pick-up, supply pipes and feed lines are readily accessible through the open top and bottom of the base skirt 31 and the open lower end of the standard 32. This arrangement enables easy accessibility to all critical portions of this invention.

It is to be understood that the disclosed versions of my device are merely preferred embodiments thereof and that many variations from the preferred embodiments are feasible without departing from the scope and spirit of my invention as disclosed and claimed.

Having thus described my invention, I claim:

1. A portable, steam puff iron consisting of: a base tank; a water supply pipe with a pick-up end and a discharge end, having its pick-up end disposed within said tank; a water feed line intersecting said water supply pipe at a point within said tank; an intake check valve disposed in said water supply pipe between the pick-up end thereof and the water feed line intersection; an outlet check valve disposed in said water supply pipe between its discharge end and said water feed line intersection; a water distributor disposed at the discharge end of said water supply pipe; a puff iron head, provided with a plurality of steam vent holes through the upper portion thereof, encasing said water distributor; an electrical heating element, encircling said water supply pipe below said water distributor, disposed within said puff iron head; a standard secured on said base tank supporting said puff iron head and encasing said water supply pipe; and means providing alternate suction and pressure to the end of said water feed line opposite from the end intersecting with said water supply pipe, thereby drawing water from said base tank through said intake check valve and passing it through said outlet check valve and the discharge end of said water supply pipe.

2. A portable, steam puff iron consisting of a base tank, a water supply pipe with a pick-up end and a discharge end, having its pick-up end disposed within said tank, means providing alternate pressure and suction intersecting with said water supply pipe at a point within said tank, an intake check valve disposed in said water supply pipe below the pressure-suction means intersection, an outlet check valve disposed in said water supply pipe above said pressure-suction means intersection, a water distributor disposed at the discharge end of said water supply pipe, a puff iron head, provided with a plurality of steam vent holes through the upper portion thereof, encasing said water distributor, and an electrical heating element, encircling said water supply pipe below said water distributor, disposed within said puff iron head, thereby drawing water from said base tank through said pick-up end of said water supply pipe and said intake check valve, passing it through said outlet check valve and said discharge end of said water supply pipe into said water distributor and disbursing it upon said heating element during operation of said means providing alternate pressure and suction.

3. A portable, steam puff iron consisting of: a tank; a water supply pipe; a water feed line intersecting outside of said tank with one end of said water supply pipe; a water distributor disposed at the other end of said water supply pipe; a water pick-up extending into said tank; an intake check valve disposed between said water pick-up and the intersection of said water feed line and said water supply pipe; an outlet check valve disposed between said water supply pipe and water feed line intersection and said water distributor; an electric heating element encircling said water supply pipe below said water distributor; a source of electricity connected to said heating element; a puff iron head, having a plurality of holes through its upper surface, encasing said water distributor and said heating element; and means providing alternate pressure and suction to the end of said water feed line opposite from the end intersecting with said water supply pipe thereby drawing water from said tank through said intake check valve and passing it through said outlet check valve to discharge upon said electric heating element.

4. A portable, steam puff iron consisting of a tank, a water supply pipe, means providing alternate pressure and suction intersecting with one end of said water supply pipe, a water distributor disposed at the other end of said water supply pipe, a water pick-up extended into said tank, an intake check valve disposed between said water pick-up and the intersection of said pressure and suction means with said water supply pipe, and an outlet check valve disposed in said water supply pipe beyond said intersection with said pressure and suction means, thereby drawing water from said tank through said intake check valve and passing it through said outlet check valve to said water distributor.

5. A portable steam puff iron consisting of: a tank; a water supply pipe; a water feed line intersecting said water supply pipe; a water distributor disposed on said water supply pipe and spaced apart from said water feed line intersection therewith; water pick-up means disposed in said tank at the end of said water supply pipe opposite from said water distributor; an intake check valve and an outlet check valve disposed in spaced relation between said water pick-up means and said water distributor, one between said water pick-up means and said intersection and the other between said intersection and said water distributor; an electric heating element disposed below said water distributor; a perforated head encasing said water distributor and said heating element; and means providing alternate pressure and suction connected to the end of said water feed line opposite from the end intersecting with said water supply line thereby drawing water from said tank through said intake check valve on suction and passing it through said outlet check valve on pressure to said water distributor and said electric heating element.

6. A portable steam puff iron consisting of: a water tank; a water distributor; a water supply line extending from said tank at one end to said water distributor at its other end; an intake check valve and an outlet check valve disposed in spaced relation in said water supply line; a feed line intersecting at one of its ends with said water supply line at a point between said intake and said outlet check valves; a heating element disposed around said water supply line at a point near said water distributor; a perforated head encasing said water distributor and said heating element; and means providing alternate pressure and suction connected to the other end of said water feed line, thereby drawing water from said water tank through said intake check valve during suction and passing it through said outlet check valve during pressure to said water distributor and said heating element.

7. A portable steam puff iron consisting of: a water tank; a water distributor; a water supply line extending from said tank at one end to said water distributor at its other end; an intake check valve and an outlet check valve disposed in spaced relation in said water supply line; a heating element disposed around said water supply line at a point near said water distributor; a perforated head encasing said water distributor and said heating element; and means providing alternate pressure and suction connected between said intake and said outlet check valves, thereby pressing water from said pressure-suction means through said outlet check valve and said water distributor to said heating element on pressure and alternately drawing water from said water tank into said pressure-suction means through said intake check valve on suction.

8. A portable steam puff iron consisting of: a water tank; a water supply line extending upwardly from said tank; water discharge means at the upper end of said water supply line; water pick-up means disposed at the lower end of said water supply line; an intake check valve and an outlet check valve disposed in spaced relation in said water supply line; heating means disposed below said water discharge means; a head, perforated on its upper surface, encasing said water discharge means and said heating means; and means providing alternate pressure and suction connected between said inlet and said outlet check valves, thereby pressing water through said outlet check valve to said water distributor and said heating element on pressure and alternately drawing water from said water tank through said intake check valve on suction.

9. In a portable steam puff iron consisting of a liquid tank, a liquid supply line extending upwardly from said tank, liquid discharge means at the upper end of said liquid supply line, liquid pick-up means disposed at the lower end of said liquid supply line, heating means disposed below said liquid discharge means and a head perforated on its upper surface encasing said liquid discharge means and said heating means: an intake check valve and an outlet check valve disposed in spaced relation in a said liquid supply line; and means providing alternate pressure and suction connected between said intake and said outlet check valves, thereby pressing liquid from a tank through said outlet check valve on pressure and alternately drawing liquid from said tank through said intake check valve on suction.

10. A steam puff iron consisting of liquid retaining means, supply means extending from said liquid retaining means, distributing means at the opposite end of said supply means from said liquid retaining means, heating means disposed near said distributing means, means with perforations therethrough encasing said distributing means and said heating means, means intaking liquid and means outletting liquid disposed in spaced relation in said supply means, and means alternately sucking in liquid from said liquid retaining means through said intaking means and then pressing it out through said outletting means to discharge through said distributing means upon said heating means, thereby forming a vapor and emitting said vapor through said perforations in said encasing means.

References Cited by the Examiner
UNITED STATES PATENTS

| | | | |
|---|---|---|---|
| 154,149 | 8/74 | Paget | 103—148 |
| 186,741 | 1/77 | Maas et al. | 103—148 |
| 1,552,379 | 1/25 | Martens | 38—99 |
| 2,501,747 | 3/50 | Stovers | 38—99 |
| 2,606,434 | 8/52 | Habes | 68—6 |
| 2,782,537 | 2/57 | Ver-Gege | 38—77 |
| 3,029,535 | 4/62 | Clearman et al. | 38—14 |
| 3,041,758 | 7/62 | McIntyre | 38—99 |

JORDAN FRANKLIN, *Primary Examiner.*
DAVID J. WILLIAMOWSKY, *Examiner.*